(12) United States Patent
Sun et al.

(10) Patent No.: US 6,716,916 B1
(45) Date of Patent: Apr. 6, 2004

(54) THERMOPLASTIC MOLDING MATERIALS BASED ON PARTICULAR GRAFT RUBBER CONSTITUENTS

(75) Inventors: Liqing-Lee Sun, Irvine, CA (US); Herbert Eichenauer, Dormagen (DE); Heinrich Alberts, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 6 days.

(21) Appl. No.: 10/069,862

(22) PCT Filed: Aug. 21, 2000

(86) PCT No.: PCT/EP00/08123

§ 371 (c)(1), (2), (4) Date: Apr. 15, 2002

(87) PCT Pub. No.: WO01/16230

PCT Pub. Date: Mar. 8, 2001

(30) Foreign Application Priority Data

Sep. 1, 2000 (DE) .......................... 199 41 491

(51) Int. Cl.$^7$ .......................... C08F 279/00; C08F 4/40; C08L 55/02
(52) U.S. Cl. .......................... 525/66; 525/64; 525/67; 525/73; 525/74; 525/77; 525/84; 525/86; 525/261; 525/316
(58) Field of Search .......................... 525/64, 66, 67, 525/73, 74, 77, 84, 86, 261, 316

(56) References Cited

U.S. PATENT DOCUMENTS

| | | | |
|---|---|---|---|
| 3,542,905 A | 11/1970 | Nishioka et al. | 260/879 |
| 4,009,226 A | 2/1977 | Ott et al. | 260/876 R |
| 4,151,128 A * | 4/1979 | Ackerman | |
| 4,181,788 A | 1/1980 | Wingler et al. | 526/68 |
| 5,552,465 A | 9/1996 | Witmann et al. | 524/139 |
| 5,700,852 A | 12/1997 | Iwanaga et al. | 523/201 |
| 6,489,379 B1 * | 12/2002 | Eichenauer | |

FOREIGN PATENT DOCUMENTS

| | | |
|---|---|---|
| EP | 0 051 336 | 5/1982 |
| GB | 1255797 | 12/1971 |
| JP | 48-007516 | * 3/1973 |
| WO | 00/04067 | 1/2000 |

* cited by examiner

Primary Examiner—David J. Buttner
(74) Attorney, Agent, or Firm—Joseph C. Gil; Aron Preis

(57) ABSTRACT

A molding composition containing a graft polymer is disclosed. The graft is a product of a free-radical emulsion polymerization of resin-forming vinyl monomers in the presence of rubber present in latex form having a glass transition temperature of ≦0° C. using an initiator combination comprising a persulfate compound and a redox initiator system. The process for preparing the graft polymer entails adding the persulfate compound at the beginning of the graft polymerization reaction and a later addition of the redox initiator. The composition that features good gloss and flowability is suitable for the preparation of molded articles.

16 Claims, No Drawings

THERMOPLASTIC MOLDING MATERIALS BASED ON PARTICULAR GRAFT RUBBER CONSTITUENTS

The present invention provides thermoplastic moulding compositions of the ABS type or of the ABS blend type containing improved graft rubber components which are obtained by emulsion polymerisation using specific initiator systems while defined reaction conditions are maintained.

Moulding compositions of the ABS type are two-phase plastics comprising

I) a thermoplastic copolymer in particular of styrene and acrylonitrile, in which the styrene may be replaced entirely or in part by α-methylstyrene or methyl methacrylate; this copolymer, also known as SAN resin or matrix resin, forms the outer phase;

II) at least one graft polymer which has been produced by a graft reaction of one or more of the monomers stated in I onto butadiene homo- or copolymer ("grafting backbone"). The graft polymer ("elastomer phase" or "graft rubber") forms the disperse phase in the matrix resin.

These blends of plastics may additionally contain further polymer components such as for example aromatic polycarbonate resins, polyestercarbonate resins, polyester resins or polyamide resins, so resulting in so-called ABS blend systems.

Graft rubbers produced using redox initiator systems have proved particularly effective as impact modifiers for both ABS moulding compositions and ABS blend systems (c.f. for example EP 482 451 and the literature cited therein), wherein good toughness properties are generally achieved. Disadvantageously, surface gloss, elongation at break and thermoplastic flow properties are often inadequate or are subject to major variation.

Moreover, graft rubbers produced by redox initiation tend to have an elevated content of unreacted monomers which, while the content may indeed be reduced by adding metal ions (for example Fe ions) to the reaction mixture, impairs other properties (for example thermal stability, polymer colour).

There is accordingly a requirement for graft rubbers which do not exhibit these disadvantages and for a process by means of which ABS and ABS blend moulding compositions without the stated disadvantages may be produced.

It has now been found that moulding compositions having very good surface gloss, elevated elongation at break and good melt processability may be obtained without any negative effects on other properties if the graft rubber used is produced using specific combinations of initiator systems while maintaining defined reaction conditions.

The invention provides thermoplastic moulding compositions of the ABS type or of the ABS blend type containing A) at least one elastic/thermoplastic graft polymer obtained by free-radical emulsion polymerisation of resin-forming vinyl monomers, preferably of compounds of the formulae (I) and (II) described below, particularly preferably of styrene and/or acrylonitrile, wherein styrene and/or acrylonitrile may be replaced entirely or in part by α-methylstyrene, methyl methacrylate or N-phenylmaleimide, in the presence of rubber present in latex form having a glass transition temperature of $\leq 0°$ C. using an initiator combination comprising a persulfate compound and a redox initiator system and B) at least one copolymer of styrene and acrylonitrile, wherein styrene and/or acrylonitrile may be replaced entirely or in part by α-methylstyrene or methyl methacrylate or N-phenylmaleimide and optionally C) at least one resin selected from the group of polycarbonates, polyestercarbonates, polyesters and polyamides, characterised in that at the beginning of the graft polymerisation reaction the persulfate compound is added in quantities of 0.05 to 1.5 wt. %, preferably of 0.08 to 1.2 wt. % and particularly preferably of 0.1 to 1.0 wt. % (in each case relative to the monomers apportioned up to the time of addition of the redox initiator), after addition of 1 to 50 wt. %, preferably of 2.5 to 40 wt. %, particularly preferably of 5 to 30 wt. % and very particularly preferably of 7.5 to 25 wt. % of the monomers (in each case relative to the total quantity of monomers), the redox initiator components are added in quantities of 0.1 to 2.5 wt. %, preferably of 0.2 to 2 wt. % and particularly preferably of 0.5 to 1.5 wt. % (in each case relative to the monomers apportioned since the time of addition of the redox initiator).

Rubbers suitable for the production of the elastic/thermoplastic graft polymers according to the invention art in principle any rubbery polymers in emulsion form having a glass transition temperature of below 0° C.

The following may, for example, be used:

diene rubbers, i.e. homopolymers of conjugated dienes having 4 to 8 C atoms such as butadiene, isoprene, chloroprene or the copolymers thereof with up to 60 wt. %, preferably up to 30 wt. % of a vinyl monomer, for example acrylonitrile, methacrylonitrile, styrene, α-methylstyrene, halostyrenes, $C_1$–$C_4$allylstyrenes, $C_1$–$C_8$ alkyl acrylates, $C_1$–$C_8$ alkyl methacrylates, alkylene glycol diacrylates, alkylene glycol dimethacrylates, divinylbenzene;

acrylate rubbers, i.e. homo- or copolymers of $C_1$–$C_{10}$ alkyl acrylates, for example homopolymers of ethyl acrylate, butyl acrylate or copolymers with up to 40 wt. %, preferably no more than 10 wt. % of monovinyl monomers, for example styrene, acrylonitrile, vinyl butyl ether, acrylic acid (esters), methacrylic acid (esters), vinylsulfonic acid. The acrylate rubber homo- or copolymers which are preferably used are those which contain 0.01 to 8 wt. % of divinyl or polyvinyl compounds and/or N-methylolmethacrylamide or N-methylolacrylamide or other compounds which act as crosslinking agents, for example divinylbenzene, triallyl cyanurate.

Polybutadiene rubbers, SBR rubbers with up to 30 wt % of styrene incorporated by polymerisation and acrylate rubbers, in particular those having a core/shell structure, for example as described in DE-OS 3 006 804, are preferred.

Latices considered for the production of the graft polymers according to the invention are those having average particle diameters $d_{50}$ of 0.05 to 2.0 μm, preferably of 0.08 to 1.0 μm and particularly preferably of 0.1 to 0.5 μm. The gel contents of the rubbers used may be varied within broad limits, preferably lying between 30 and 95 wt. % (determined using the wire cage method in toluene (c.f. Houben-Weyl, *Methoden der organischen Chemie, Makromolekulare Stoffe*, part 1, p. 307 (1961), Thieme Verlag Stuttgart)).

Mixtures of rubber latices having a) average particle diameters $d_{50}$ of $\leq 320$ nm, preferably of 260 to 310 nm, and gel contents of $\leq 70$ wt. %, preferably of 40 to 65 wt. %, and b) average particle diameters $d_{50}$ of $\leq 370$ nm, preferably of 380 to 450 nm, and gel contents of $\leq 70$ wt. %, preferably of 75 to 90 wt. %, are very particularly preferred.

The rubber latex (a) here preferably has a width of the particle size distribution of 30 to 100 nm, particularly preferably of 40 to 80 nm, while that of the rubber latex (b) is of 50 to 500 nm, particularly preferably of 100 to 400 nm (in each case measured as the $d_{90-d10}$ value of the overall particle size distribution).

The mixtures contain the rubber latices (a) and (b) preferably in a weight ratio of 90:10 to 10:90, particularly preferably of 60:40 to 30:70 (in each case relative to the particular solids content of the latices).

The average particle diameters are determined by ultracentrifugation (c.f. W. Scholtan, H. Lange, *Kolloid-Z. u Z. Polymere* 250, pp. 782–796 (1972)).

The stated gel content values relate to determination using the wire cage method in toluene (c.f. Houben-Weyl, *Methoden der organischen Chemie. Makromolekulare Stoffe*, part 1, p. 307 (1961), Thieme Verlag Stuttgart).

The rubber latices used may be produced by emulsion polymerisation, the necessary reaction conditions, auxiliaries and working methods being known in principle.

It is also possible initially to produce a finely divided rubber polymer using known methods and then to agglomerate it in known manner to establish the required particle size. Relevant techniques have been described (c.f. EP-B 0 029 613; EP-B 0 007 810; DD-PS 144 415; DE-AS 12 33 131; DE-AS 12 58 076; DE-OS 21 01 650; U.S. Pat. No. 1,379,391).

It is also possible to use the so called seed polymerisation technique, in which a finely divided butadiene polymer, for example, is first produced and then further polymerised to yield larger particles by further reaction with monomers containing butadiene.

Emulsifiers which may be used are conventional anionic emulsifiers such as alkyl sulfates, alkyl sulfonates, aralkyl sulfonates, soaps of saturated or unsaturated fatty acids (for example oleic acid, stearic acid) as well as alkaline disproportionated or hydrogenated abietic or tall oil acid, with emulsifiers having a carboxyl group (for example salts of $C_{10}$–$C_{18}$ fatty acids, disproportionated abietic acid) preferably being used.

Rubber polymer latices may, in principle, also be produced by emulsifying complete rubber polymers in aqueous media (c.f. Japanese patent application 55 125 102).

Suitable graft monomers which are polymerised in the presence of the rubbery polymers present in emulsion form comprise virtually any compounds which may be polymerised in emulsion to yield thermoplastic resins, for example vinyl aromatics of the formula (I) or compounds of the formula (II) or mixtures thereof

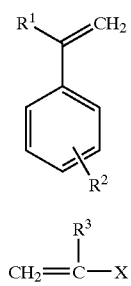

in which
R$^1$ represents hydrogen or methyl,
R$^2$ represents hydrogen, halogen or alkyl having 1 to 4 carbon atoms in ortho, meta or para position,
R$^3$ represents hydrogen or methyl and
X represents CN, R$^4$OOC or R$^5$R$_6$NOC, in which
  R$^4$ means hydrogen or alkyl having 1 to 4 carbon atoms; and
  R$^5$ and R$_6$ mutually independently mean hydrogen, phenyl or alkyl having 1 to 4 carbon atoms.

Examples of compounds of the formula (I) are styrene, α-methylstyrene, p-methyl-styrene and vinyltoluene. Compounds of the formula (II) are acrylonitrile and methyl methacrylate. Further monomers which are suitable in principle are, for example, vinyl acetate and N-phenylmaleimide.

Preferred monomers are mixtures of styrene and acrylonitrile, α-methylstyrene and acrylonitrile, of styrene, acrylonitrile and methyl methacrylate, as well as combinations of these monomer mixtures with N-phenylmaleimide.

Preferred graft polymers A) according to the invention are those which are obtained by graft polymerisation of styrene and acrylonitrile in a weight ratio of 90:10 to 50:50, preferably of 80:20 to 65:35 (wherein styrene may be replaced entirely or in part by α-methylstyrene or methyl methacrylate) in the presence of quantities of rubber, preferably polybutadiene, such that the resultant graft polymers have rubber contents of 20 to 80 wt. %, preferably of 30 to 75 wt. % and particularly preferably of 35 to 70 wt %.

The graft polymers A) are here produced according to the invention in such a manner that, at the beginning of the graft reaction, at least one persulfate compound is added to the rubber latex or rubber latex mixture.

Suitable persulfate compounds are, for example and preferably sodium peroxy-disulfate, potassium peroxydisulfate, ammonium peroxydisulfate, with potassium peroxydisulfate being a particularly preferred persulfate compound.

The persulfate compound is added in quantities of 0.05 to 1.5 wt %, preferably of 0.08 to 1.2 wt. % and particularly preferably of 0.1 to 1.0 wt % (in each case relative to the monomers apportioned before or from the start of addition of the persulfate compound).

Once the graft monomers have subsequently been further apportioned and once a quantity of 1 to 50 wt. %, preferably of 2.5 to 40 wt. %, particularly preferably of 5 to 30 wt. % and very particularly preferably of 7.5 to 25 wt. % has been added (in each case relative to the total quantity of monomers), a redox initiator system is added.

Suitable redox initiator systems generally consist of an organic oxidising agent and reducing agent, wherein heavy metal ions are preferably additionally present in the reaction medium.

Organic oxidising agents suitable according to the invention are for example and preferably di-ter-butyl peroxide, cumene hydroperoxide, dicyclohexyl percarbonate, tert.-butyl hydroperoxide, p-menthane hydroperoxide or mixtures thereof, with cumene hydroperoxide and tert.-butyl hydroperoxide being particularly preferred. $H_2O_2$ may also be used.

Reducing agents usable according to the invention are preferably water-soluble compounds having a reducing action, preferably selected from the group comprising salts of sulfinic acid, salts of sulfurous acid, sodium dithionite, sodium sulfite, sodium hyposulfite, sodium hydrogen sulfite, ascorbic acid and the salts thereof, Rongalit C (sodium formaldehyde sulfoxylate), mono- and dihydroxyacetone, sugars (for example glucose or dextrose), iron(II) salts, such as iron(II) sulfate, tin(a) salts, such as for example tin(II) chloride, titanium(III) salts, such as titanium(III) sulfate.

Particularly preferred reducing agents are dextrose, ascorbic acid (salts) or sodium formaldehyde sulfoxylate Rongalit C).

The quantity of the redox initiator component is divided between the oxidising and reducing agents as follows:

The quantity of oxidising agent used generally amounts to 0.05 to 2.0 wt. %, preferably to 0.1 to 1.5 wt. % and particularly preferably to 0.2 to 1.2 wt. %. The quantity of reducing agent generally amounts to 0.05 to 1.5 wt. %, preferably to 0.08 to 1.2 wt. % and particularly preferably to 0.1 to 1.0 wt. %.

Conventionally, both the persulfate compound and the redox initiator components are used in the form of aqueous solutions, aqueous emulsions, aqueous suspensions or other aqueous dispersions.

The remaining monomers are then apportioned and polymerised to completion.

The invention furthermore provides a process for the production of graft rubbers by emulsion polymerisation using an initiator combination of a persulfate compound and a redox system, wherein
  i) the graft monomers are apportioned to the rubber latex,
  ii) at the beginning of the graft polymerisation reaction the persulfate compound is added in quantities of 0.05 to 1.5 wt. % (relative to the monomers apportioned up to the time of addition of the persulfate compound) and
  iii) after addition of 1 to 50 wt. % of the monomers (relative to the total quantity of monomers), the redox initiator components are added in quantities of 0.1 to 2.5 wt. % (relative to the monomers apportioned since the time of addition of the persulfate compound).

The reaction temperature during the production according to the invention of the graft rubbers A) may be varied within broad limits. The temperature is generally 25° C. to 160° C., preferably 40° C. to 90° C.; very particularly preferably the temperature at the beginning of monomer apportionment differs from the temperature at the end of monomer apportionment by at most 20° C., preferably by at most 10° C. and particularly preferably by at most 5° C.

Chain transfer agents may additionally be used during the graft polymerisation, preferably in quantities of 0.05 to 2 wt. %, particularly preferably in quantities of 0.1 to 1 wt. % (in each case relative to the total quantity of monomers).

Suitable chain transfer agents are, for example, n-dodecyl mercaptan, t-dodecyl mercaptan, dimeric α-methylstyrene, terpinolene and combinations of these compounds.

The above-stated compounds may be used as emulsifier during the graft polymerisation reaction.

The graft rubber latex A) is worked up using known methods, for example by spray drying or by addition of salts and/or acids, washing the precipitation products and drying the powder.

Vinyl resins B) which are used are preferably copolymers of styrene and acrylonitrile in a ratio by weight of 90:10 to 50:50, wherein styrene and/or acrylonitrile may be replaced entirely or in part by α-methylstyrene and/or methyl methacrylate; a proportion of up to 30 wt. % (relative to the vinyl resin) of a further monomer from the series maleic anhydride, maleimide, N-(cyclo)alkylmaleimide, N-(alkyl) phenylmaleimide may optionally also be used.

The weight average molecular weights ($\overline{M}_w$) of these resins may be varied within broad limits and are preferably between approx. 40000 and 200000, particularly preferably between 50000 and 150000.

Details relating to the production of these resins are described, for example, in DE-AS 2 420 358 and DE-AS 2 724 360. Resins produced by bulk or solution polymerisation and by suspension polymerisation have proved particularly suitable.

The proportion of the elastic/thermoplastic graft polymer (A) in the moulding compositions according to the invention may be varied within broad limits; the proportion is preferably from 1 to 80 wt. %, particularly preferably from 5 to 50 wt. %.

Necessary or convenient additives, for example antioxidants, UV stabilisers, peroxide scavengers, antistatic agents, lubricants, mould release agents, flame retardants, fillers or reinforcing materials (glass fibres, carbon fibres etc.) and colorants may be added to the moulding compositions according to the invention during production, working up, processing and final shaping.

Final shaping may be performed in conventional commercial processing units and comprises, for example, injection moulding, sheet extrusion optionally followed by thermoforming, cold forming, extrusion of tubes and profiles or calendering.

The ABS type moulding compositions according to the invention may be blended with other polymers (component C). Suitable blend partners are, for example, selected from at least one polymer selected from the group of polycarbonates, polyesters, polyestercarbonates and polyamides.

Suitable thermoplastic polycarbonates and polyestercarbonates are known (c.f. for example DE-AS 1 495 626, DE-OS 2 232 877, DE-OS 2 703 376, DE-OS 2 714 544, DE-OS 3 000 610, DE-OS 3 832 396, DE-OS 3 077 934) and may be produced, for example, by reacting diphenols of the formulae (III) and/or (IV)

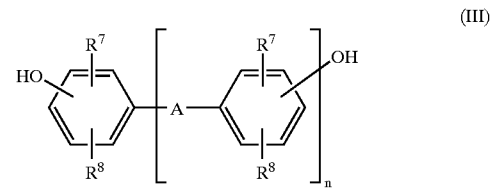

(III)

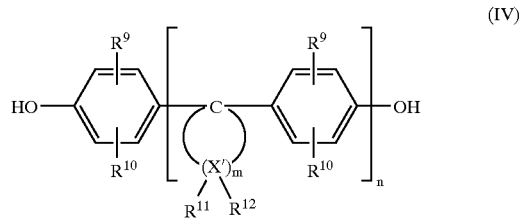

(IV)

in which
  A is a single bond, $C_1$–$C_5$ alkylene, $C_2$–$C_5$ alkylidene, $C_5$–$C_6$ cycloalkylidene, —O—, —S—, —SO—, —$SO_2$— or —CO—,
  $R^7$ and $R^8$ mutually independently denote hydrogen, methyl or halogen, in particular hydrogen, methyl, chlorine or bromine,
  $R^9$ and $R^{10}$ mutually independently mean hydrogen, halogen, preferably chlorine or bromine, $C_1$–$C_8$ alkyl, preferably methyl, ethyl, $C_5$–$C_6$ cycloalkyl, preferably cyclohexyl, $C_6$–$C_{10}$ aryl, preferably phenyl, or $C_7$–$C_{12}$ aralkyl, preferably phenyl-$C_1$–$C_4$-alkyl, in particular benzyl,
  m is an integer from 4 to 7, preferably 4 or 5,
  n is 0 or 1,
  $R^{11}$ and $R^{12}$ are individually selectable for each X and mutually independently mean hydrogen or $C_1$–$C_6$ alkyl and
  X' means carbon,
  with carbonic acid halides, preferably phosgene, and/or with aromatic dicarboxylic acid dihalides, preferably benzenedicarboxylic acid dihalides, by phase interface polycondensation or with phosgene by polycondensation in the homogeneous phase (using the so-called pyridine process), wherein molecular weight may be adjusted in known manner by an appropriate quantity of known chain terminators.

Suitable diphenols of the formulae (III) and (IV) are, for example, hydroquinone, resorcinol, 4,4'-dihydroxydiphenyl, 2,2-bis-(4-hydroxyphenyl)propane, 2,4-bis-(4-hydroxyphenyl)-2-methylbutane, 2,2-bis-(4-hydroxy-3,5-dimethylphenyl)propane, 2,2-bis-(4-hydroxy-3,5-dichlorophenyl)propane, 2,2-bis-(4-hydroxy-3,5-dibromophenyl)propane, 1,1-bis-(4-hydroxyphenyl)cyclohexane, 1,1-bis-(4-hydroxyphenyl)-3,3,5-trimethylcyclohexane, 1,1-bis-(4-hydroxyphenyl)-3,3-dimethylcyclohexane, 1,1-bis-(4-hydroxyphenyl)-3,3,5,5-tetramethylcyclohexane or 1,1-bis-(4-hydroxy-phenyl)-2,4,4-trimethylcyclopentane.

Preferred diphenols of the formula (III) are 2,2-bis-(4-hydroxyphenyl)propane and 1,1-bis-(4-hydroxyphenyl) cyclohexane and the preferred phenol of the formula (IV) is 1,1-bis-(4-hydroxyphenyl)-3,3,5-trimethylcyclohexane.

Mixtures of diphenols may also be used.

Suitable chain terminators are, for example, phenol, p-tert.-butylphenol, long-chain alkylphenols such as 4-(1,3-tetramethylbutyl)phenol according to DE-OS 2 842 005, monoalkylphenols, dialkylphenols having a total of 8 to 20 C atoms in the alkyl substituents according to DE-OS 3 506 472, such as p-nonylphenol, 2,5-tert.-butylphenol, p-tert.-octylphenol, p-dodecylphenol, 2-(3,5dimethylheptyl)phenol and 4-(3,5-dimethylheptyl)phenol. The required quantity of chain terminators is in general from 0.5 to 10 mol %, relative to the sum of diphenols (I) and (II).

Suitable polycarbonates or polyestercarbonates may be linear or branched; branched products are preferably obtained by incorporating from 0.05 to 2.0 mol %, relative to the sum of diphenols used, of trifunctional or greater than trifunctional compounds, for example those having three or more than three phenolic OH groups.

Suitable polycarbonates or polyestercarbonates may contain aromatically attached halogen, preferably bromine and/or chlorine; they preferably contain no halogen.

They have average molecular weights ($\overline{M}_w$, weight average), determined for example by ultracentrifugation or light scattering, of 10000 to 200000, preferably of 20000 to 80000.

Suitable thermoplastic polyesters are preferably polyalkylene terephthalates, ie. reaction products prepared from aromatic dicarboxylic acids or the reactive derivatives thereof (for example dimethyl esters or anhydrides) and aliphatic, cycloaliphatic or arylaliphatic diols and mixtures of such reaction products.

Preferred polyalkylene terephthalates may be produced using known methods from terephthalic acids (or the reactive derivatives thereof) and aliphatic or cycloaliphatic diols having 2 to 10 C atoms (*Kunststoff-Handbuch*, volume VIII, pp. 695 et seq., Carl Hanser Verlag, Munich 1973).

In preferred polyalkylene terephthalates, 80 to 100, preferably 90 to 100 mol % of the dicarboxylic acid residues are terephthalic acid residues and 80 to 100, preferably 90 to 100 mol % of the diol residues are ethylene glycol or 1,4-butanediol residues.

In addition to ethylene glycol or 1,4-butanediol residues, preferred polyalkylene terephthalates may contain 0 to 20 mol % of other aliphatic diols having 3 to 12 C atoms or cycloaliphatic diols having 6 to 12 C atoms, for example residues of 1,3-propanediol, 2-ethyl-1,3-propanediol, neopentyl glycol, 1,5-pentanediol, 1,6-hexanediol, 1,4-cyclohexanedimethanol, 3-methyl-1,3- and -1,6-pentanediol, 2-ethyl-1,3-hexanediol, 2,2-diethyl-1,3-propanediol, 2,5-hexanediol, 1,4-bis-(β-hydroxyethoxy) benzene, 2,2-bis-(4-hydroxycyclohexyl)propane, 2,4-dihydroxy-1,1,3,3-tetramethylcyclobutane, 2,2-bis-(3β-hydroxyethoxyphenyl)propane and 2,2-bis-(4-hydroxypropoxyphenyl)propane (DE-OS 2 407 647, 2 407 776, 2 715 932).

The polyalkylene terephthalates may be branched by incorporation of relatively small quantities of tri- or tetrahydric alcohols or tri- or tetrabasic carboxylic acids, as are described in DE-OS 1 900 270 and U.S. Pat. No. 3,692,744. Examples of preferred branching agents are trimesic acid, trimellitic acid, trimethylolethane, trimethylolpropane and pentaerythritol. It is advisable to use no more than 1 mol % of the branching agent, relative to the acid component.

Particularly preferred polyalkylene terephthalates are those which have been produced solely from terephthalic acid and the reactive derivatives thereof (for example the dialkyl esters thereof) and ethylene glycol and/or 1,4-butanediol and mixtures of these polyalkylene terephthalates.

Preferred polyalkylene terephthalates also comprise copolyesters which are produced from at least two of the above-stated alcohol components: poly(ethylene glycol/1,4-butanediol) terephthalates are particularly preferred copolyesters.

Preferably suitable polyalkylene terephthalates generally have an intrinsic viscosity of 0.4 to 1.5 dl/g, preferably of 0.5 to 1.3 dl/g, in particular of 0.6 to 1.2 dl/g, in each case measured in phenol/o-dichlorobenzene (1:1 parts by weight) at 25° C.

Suitable polyamides are known homopolyamides, copolyamides and mixtures of these polyamides. These may comprise partially crystalline and/or amorphous polyamides.

Suitable partially crystalline polyamides are polyamide 6, polyamide 6,6, mixtures and corresponding copolymers of these components. Further partially crystalline polyamides which may be considered are those having an acid component entirely or partially consisting of terephthalic acid and/or isophthalic acid and/or suberic acid and/or sebacic acid and/or azelaic acid and/or adipic acid and/or cyclohexane-dicarboxylic acid and a diamine component entirely or partially consisting of m-and/or p-xylylenediamine and/or hexamnethylenediamine and/or 2,2,4-trimethylhexa-methylenediamine and/or 2,2,4-trimethylhexamethylenediamine and/or isophoronediamine, and the composition of which is known in principle.

Further polyamides which may be mentioned are those produced entirely or in part from lactams having 7 to 12 ring C atoms, optionally together with one or more of the above-stated starting components.

Particularly preferred partially crystalline polyamides are polyamide 6 and polyamide 6,6 and mixtures thereof. Amorphous polyamides which may be used are known products. They are obtained by polycondensation of diamines, such as ethylene-diamine, hexamethylenediamine, decamethylenediamine, 2,2,4- and/or 2,4,4-trimethylhexamethylenediamine, m- and/or p-xylylenediamine, bis-(4-aminocyclohexyl)methane, bis-(4-aminocyclohexyl)propane, 3,3'-dimethyl4,4'-diaminodicyclohexylmethane, 3-aminomethyl-3,5,5-trimethylcyclohexylamine, 2,5-and/or 2,6-bis-(aminomethyl)norbornane and/or 1,4diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Copolymers which are obtained by polycondensing two or more monomers are also suitable, as are copolymers which are produced with the addition of aminocarboxylic acids such as ε-aminocaproic acid, ω-aminoundecanoic acid or ω-aminolauric acid or the lactams thereof.

Particularly suitable amorphous polyamides are the polyamides produced from isophthalic acid, hexamethylenediamine and further diamines such as 4,4'-diaminodicyclohexylmethane, isophoronediamine, 2,2,4- and/or 2,4,4-trimethylhexamethy-lenediamine, 2,5- and/or 2,6-bis-(aminomethyl)norbornene; or from isophthalic acid, 4,4'-diaminodicyclohexylmethane and ε-caprolactam; or from isophthalic acid, 3,3'-dimethyl-4,4'-diaminodicyclohexylmethane and laurolactam; or from terephthalic acid and the isomer mixture of 2,2,4- and/or 2,4,4-trimethylhexamethylenediamine.

Instead of pure 4,4'-diaminodicyclohexylmethane, it is also possible to use mixtures of the positional isomers of diaminodicyclobexylmethane composed of 70 to 99 mol % of the 4,4'-diamino isomer 1 to 30 mol % of the 2,4'-diamino isomer 0 to 2 mol % of the 2,2'-diamino isomer and optionally correspondingly more highly condensed diamines which are obtained by hydrogenating industrial grade diaminodiphenylmethane. Up to 30% of the isophthalic acid may be replaced by terephthalic acid.

The polyamides preferably have a relative viscosity (measured on a 1wt. % solution in m-cresol at 25° C.) of 2.0 to 5.0, particularly preferably of 2.5 to 4.0.

In the event that at least one polymer selected from the group of polycarbonates, polyesters, polyestercarbonates and polyamides is additionally used, the quantity thereof amounts to up to 500 parts by weight, preferably up to 400 parts by weight and particularly preferably up to 300 parts by weight (in each case relative to 100 parts by weight of A+B).

In the following Examples, unless otherwise stated, the stated parts are always parts by weight and the stated percentages are always weight percentages.

EXAMPLES

Example 1

According to the Invention 58.5 parts by weight (calculated as solids) of a polybutadiene latex mixture (50% having an average particle diameter $d_{50}$ of 423 nm and a gel content of 82 wt. % and 50% having an average particle diameter $d_{50}$ of 288 nm and a gel content of 56 wt. %, both produced by free-radical polymerisation) are adjusted with water to a solids content of approx. 20 wt. %, whereupon the temperature is raised to 75° C. 0.1 parts by weight of potassium peroxydisulfate (dissolved in water) are then added and 6.225 parts by weight of a monomer mixture prepared from 73 wt. % of styrene and 27 wt. % of acrylonitrile are apportioned at a constant rate within 30 minutes at 75° C. 0.26 parts by weight of tert.-butyl hydroperoxide, 0.22 parts by weight of sodium ascorbate and 35.275 parts by weight of a monomer mixture (styrene/acrylonitrile=73:27) are then apportioned in parallel within 210 minutes, wherein the temperature is maintained at 75° C. In parallel with the monomers, 1.72 parts by weight (calculated as solid substance) of the sodium salt of a resin acid mixture (Dresinate 731, Abieta Chemie GmbH, Gersthofen, dissolved in alkalised water) are apportioned over 4 hours.

After 1 hour's post-reaction at 85° C., the latex is cooled to 23° C.; residual monomers are then determined by gas chromatography using the headspace method (c.f. for example B. Kolb in *Gaschromatographie in Bildern*, Wiley-VCH, Weinheim, 1999 and literature cited therein):

styrene: 3980 ppm acrylonitrile: 460 ppm.

The graft latex is then coagulated by adding approx. 1 part by weight of a phenolic antioxidant with a magnesium sulfatelacetic acid mixture and, after washing with water, the resultant powder is dried at 70° C.

Example 2

Comparison

Example 1 is repeated, wherein once the polybutadiene latex mixture has been heated to 75° C., 0.039 parts by weight of t-butyl hydroperoxide and 0.033 parts by weight of sodium ascorbate are added and then 41.5 parts by weight of a monomer mixture of 73 wt. % of styrene and 27 wt. % of acrylonitrile, 0.221 parts by weight of t-butyl hydroperoxide and 0.187 parts by weight of sodium ascorbate are apportioned at a constant rate in parallel within 4 hours.

Apportionment of the emulsifier and further processing are performed in a similar manner to Example 1.

Residual monomers:

styrene: 5750 ppm acrylonitrile: 620 ppm

Example 3

According to the Invention

Example 1 is repeated, wherein before the potassium peroxydisulfate is added, 6.225 parts by weight of the 73:27 styrene/acrylonitrile monomer mixture are added to the polybutadiene latex mixture and the remainder of the monomer mixture (35.275 parts by weight) is apportioned within 4 hours.

Addition of the redox initiator, apportionment of the emulsifier and further processing are performed in a similar manner to Example 1.

Residual monomers:

styrene: 3290 ppm acrylonitrile: 290 ppm

Example 4

Comparison

Example 3 is repeated, wherein no potassium persulfate is added to the mixture of the polybutadiene latex mixture and 6.225 parts by weight of monomer mixture and the redox initiator components described in Example 2 are added as described in Example 2.

Apportionment of emulsifier and further processing are performed in a similar manner to Example 1.

Residual monomers:

styrene: 6660 ppm acrylonitrile: 970 ppm

Production and Testing of Moulding Compositions 23.8 parts by weight of the graft polymers described in Examples 1 to 4 are mixed in an internal kneader with 32.7 parts by weight of a styrene/acrylonitrile=72:28 copolymer resin ($\overline{M}_w \approx 85000$), 42.6 parts by weight of a linear aromatic polycarbonate prepared from 2,2-bis-(4-hydroxyphenyl) propane (bisphenol A) having a relative viscosity of 1.26 (measured in $CH_2Cl_2$ at 25° C. in the form of a 0.5 wt. % solution), corresponding to an $\overline{M}_w$ of approx. 25000, and 0.75 parts by weight of pentaerythritol tetrastearate and then processed at 260° C. to yield test specimens.

Notched impact strength is determined using the ISO 1801 A method on bars of dimensions 80×10×4 mm at room temperature and at −40° C. Elongation at break, DR, is determined on F3 dumbbell test specimens during the determination of the tensile modulus of elasticity using the ISO 527 method.

Melt flow, MVR, is determined using the DIN 53 753 method at 260° C. (5 kg load).

Surface gloss is evaluated visually as follows:

+uniform, glossy surface 0 reduced surface gloss

−non-uniform surface with glossy and matt areas.

As is clear from Table 1, the moulding compositions according to the invention exhibit improved flow properties and better gloss properties.

TABLE 1

Compositions and properties of polycarbonate/ABS moulding compositions

| Example | Graft polymer used from Example | RT $a_k$ (kJ/m²) | −40° C. $a_k$ (kJ/m²) | DR (%) | MVR (cm³/10 min) | Surface gloss |
|---|---|---|---|---|---|---|
| 5 | 1 | >70 | >50 | 77 | 15.6 | + |
| 6 (Comp.) | 2 (Comp.) | >70 | >50 | 78 | 8.0 | − |
| 7 | 3 | >70 | >50 | 128 | 18.9 | + |
| 8 (Comp.) | 4 (Comp.) | >70 | >50 | 128 | 7.9 | − |

What is claimed is:

1. Moulding composition containing
   A) at least one elastic/thermoplastic graft polymer obtained by free-radical emulsion polymerisation of resin-forming vinyl monomers in the presence of rubber present in latex form having a glass transition temperature of ≦0° C. using an initiator combination comprising a persulfate compound and a redox initiator system and
   B) at least one copolymer synthesised from styrene and acrylonitrile and optionally further comonomers and optionally
   C) at least one resin selected from the group of polycarbonates, polyestercarbonates, polyesters and polyamides,
   characterised in that the graft polymer A) is produced in such a manner that, at the beginning of the graft polymerisation reaction the persulfate compound is added in quantities of 0.05 to 1.5 wt. % (relative to the monomers apportioned up to the time of addition of the redox initiator), after addition of 1 to 50 wt. % of the monomers (relative to the total quantity of monomers), the redox initiator components are added in quantities of 0.1 to 2.5 wt. % (relative to the monomers apportioned since the time of addition of the redox initiator).

2. Moulding composition according to claim 1, characterised in that component A) is present in quantities of 1 to 80 wt. %.

3. Moulding composition according to claim 1, characterised in that the rubber used is a mixture of at least two rubber latices having
   a) an average particle diameter $d_{50}$ of ≦320 nm and a gel content of ≦70 wt. % and
   b) an average particle diameter $d_{50}$ of ≦370 nm and a gel content of ≦70 wt. %.

4. Moulding composition according to claim 1, characterised in that the elastic/thermoplastic graft polymer A) has a rubber content of 20 to 80 wt. %.

5. Moulding composition according to claim 1, characterised in that the resin-forming monomers in component A) are compounds of the formula (I) or (II) or mixtures thereof:

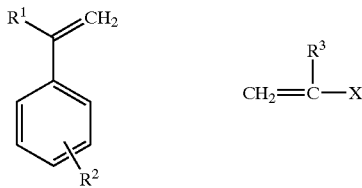

in which
   $R^1$ represents hydrogen or methyl,
   $R^2$ represents hydrogen, halogen or alkyl having 1 to 4 carbon atoms in ortho, meta or para position,
   $R^3$ represents hydrogen or methyl and
   x represents CN, $R^4OOC$ or $R^5R^6NOC$, in which
      $R^4$ means hydrogen or alkyl having 1 to 4 carbon atoms; and
      $R^5$ and $R^6$ mutually independently mean hydrogen, phenyl or alkyl having 1 to 4 carbon atoms.

6. Moulding composition according to claim 1, characterised in that the redox initiator system for the production of the graft polymer A) is selected from di-tert.-butyl peroxide, cumene hydroperoxide, dicyclohexyl percarbonate, tert.-butyl hydroperoxide, p-menthane hydroperoxide and $H_2O_2$ or mixtures thereof as the oxidising component and at least one water-soluble compound having a reducing action as the reducing component.

7. Moulding composition according to claim 6, wherein the oxidising agent is selected from cumene hydroperoxide, tert.-butyl hydroperoxide, p-menthane hydroperoxide or mixtures thereof.

8. Moulding composition according to claim 6, wherein the reducing agent is selected from salts of sulfinic acid, salts of sulfurous acid, sodium dithionite, sodium sulfite, sodium hyposulfite, sodium hydrogen sulfite, ascorbic acid and the salts thereof, Rongalit C (sodium formaldehyde sulfoxylate), mono- and dihydroxyacetone, sugars, iron(II) salts, tin(II) salts, titanium(III) salts.

9. Moulding composition according to claim 8, wherein the reducing agent is selected from dextrose, ascorbic acid or the salts thereof, sodium formaldehyde sulfoxylate or mixtures thereof.

10. Moulding composition according to claim 1, characterised in that potassium peroxydisulfate is used as the persulfate compound for the production of the graft polymer A).

11. Moulding composition according to claim 1, characterised in that the copolymer B) is synthesised from monomers selected from styrene, α-methylstyrene, acrylonitrile, methyl methacrylate, maleic anhydride, N-phenylmaleimide or mixtures thereof.

12. Moulding composition according to claim 1 additionally containing at least one resin selected from the group of polycarbonates, polyestercarbonates, polyesters and polyamides.

13. Process for the production of graft polymers containing rubber by emulsion polymerisation using an initiator combination of a persulfate compound and a redox initiator system, characterised in that
  i) the graft monomers are apportioned to the rubber latex,
  ii) at the beginning of the graft polymerisation reaction the persulfate compound is added in quantities of 0.05 to 1.5 wt. % (relative to the monomers apportioned up to the time of addition of the persulfate compound)
  iii) after addition of 1 to 50 wt. % of the monomers (relative to the total quantity of monomers), the redox initiator components are added in quantities of 0.1 to 2.5 wt. % (relative to the monomers apportioned since the time of addition of the persulfate compound).

14. The graft polymer prepared by the process of claim 13.

15. A molded article comprising the graft polymer of claim 14.

16. A molded article comprising the composition of claim 1.

* * * * *